United States Patent
Lai

(10) Patent No.: US 7,196,127 B2
(45) Date of Patent: Mar. 27, 2007

(54) BIODEGRADABLE POLYESTERAMIDE AND PREPARATION METHOD

(76) Inventor: Jen-Show Lai, P.O. Box No. 6-57, Junghe, Taipei 235 (TW)

( * ) Notice: Subject to any disclaimer, the term of this patent is extended or adjusted under 35 U.S.C. 154(b) by 187 days.

(21) Appl. No.: 10/665,126

(22) Filed: Sep. 22, 2003

(65) Prior Publication Data

US 2005/0065314 A1    Mar. 24, 2005

(51) Int. Cl.
*C08G 69/44*    (2006.01)

(52) U.S. Cl. .................... 524/141; 528/288; 525/425

(58) Field of Classification Search ........... 528/271, 528/310, 323, 324, 329.1, 332, 335, 336, 528/337; 525/418, 419, 420, 432, 434
See application file for complete search history.

(56) References Cited

U.S. PATENT DOCUMENTS

| | | | | |
|---|---|---|---|---|
| 3,997,626 A | * | 12/1976 | Bernert et al. ............... | 525/425 |
| 4,101,524 A | * | 7/1978 | Burzin et al. ................ | 528/288 |
| 4,380,622 A | * | 4/1983 | Chiba et al. ................. | 528/288 |
| 4,483,975 A | * | 11/1984 | de Jong et al. .............. | 528/288 |
| 4,515,981 A | * | 5/1985 | Otani et al. .................... | 560/50 |
| 5,644,020 A | * | 7/1997 | Timmermann et al. ..... | 528/288 |
| 6,268,465 B1 | * | 7/2001 | Chomiakow et al. ....... | 528/310 |

OTHER PUBLICATIONS

Chemical Abstracts registry number 59602-16-3 and structure.*

* cited by examiner

*Primary Examiner*—David J. Buttner
(74) *Attorney, Agent, or Firm*—Troxell Law Office PLLC

(57) ABSTRACT

A biodegradable polyesteramide and preparation method, having a formulation that contains (a) a diacid: 30%~70% by weight (b) a diol: 10%~50% by weight (c) an amide: 5%~70% by weight (d) a diamine: 10%~70% by weight (e) a branching agent: 0%~10% by weight (f) a catalyst: an organic compound containing tin, 0 ppm~50 ppm total proportion by weight (g) an antioxidant: an aromatic antioxidant, 0%~5% by weight. A polycondensation reaction proceeds under nitrogen protection, and at a temperature of 140° C.~270° C., and under this reaction temperature a vacuum polycondensation reaction proceeds for 4–6 hours, whereupon the biodegradable polyesteramide is acquired having a melting point of 125° C.~130° C., a stretchability strength of 19~28 Mpa, a fracture tensibility ratio of 80%~300%. Under conditions where PH=12 and at a temperature of 80° C. complete degradation can be realized. A structural formula for the biodegradable triblock polyesteramide is as below:

$[OC(CH_2)_4-COO(CH_2)_4O]_m[OC(CH_2)_4COHN(CH_2)_6NH]_n[OC(CH_2)_6NH]_p.$

9 Claims, No Drawings

BIODEGRADABLE POLYESTERAMIDE AND PREPARATION METHOD

BACKGROUND OF THE INVENTION (a) Field of the Invention

The present invention involves a biodegradable triblock polyesteramide and preparation method, and furthermore pertains to synthesis of macromolecular materials. Products made from the biodegradable polyesteramide are primarily used in materials for environmental protection materials and biomedicine usage.

(b) Description of the Prior Art

J. Appl. Polym. Sci 20, 975(1976) discloses preparation of an amide-terminated polycaprolactone and fusion ester interchange reaction with polyethylene terephthalate (PET), acquiring an amide-chain distributed polyesteramide. However, materials from the preparation as disclosed have no application in biodegradable and environment degradation use.

Biological Chemistry, PP513~521, E. H. Cordes, ed, Harper & Row, New York (1996); Polymer in Medicine II PP80~85, E Chiellini ed, Plenum Press, New York (1966); E. J. Bioeng. 1,231 (1977); J. Biomed. Mater. Res.16,117 (1982); Trans, Soc. Biomater.6,109(1983), 7,210 (1984); Trans. Fourth World Biomaterials Congress 15,249,408 (1922); J. Biochim. Biophys. Acta 1042, 182 (1990); (U.S. Pat. No. 4,343,931) (1982); (U.S. Pat. No. 4,529,735) (1985). Aforesaid articles disclose reactions between hydroxy acetic acids and aliphatic diamines to synthesize aminediols, and revealing research into biodegradability and bioabsorbability of the products resulting therefrom.

Research has been carried out on derivatives of aminediols and aliphatic diacids to prepare biodegradable and bioabsorbable polyesteramides, and includes detailed composition tables of structure and properties, as well as disclosing preparation methods for use in medical surgical operation sutures, and applications in biodegradable artificial internal fastener devices employed in bone fractures. However, structural polyesteramides are quasi-crystalline macromolecular polymers, and speed of biodegradation is hard to regulate and control, and results in additional side effects appearing. Furthermore, reasons of cost results in the polymers not being extensively applied for environmental protection materials.

Journal of Chemistry 72. 867 (1972) discloses a L-lactic acid chain-linked polyesteramide. However, monomer synthesis is relatively complicated, and a polymer prepared therefrom behaves as a copolymer of L-lactic acid and poly-L-lactic acid amide. Further, P. R. China patent 9812899.7 discloses a polyesteramide copolymer containing a SL-lactic acid. However, synthesis of the polyesteramides is relatively complicated and is difficult to overcome occurrence of side reactions such as ester interchange, etc., as well as resulting in appearance of deep color changes in the polymers or copolymers prepared therefrom. Moreover, Kuhst Stoffe 85.(8),161 (1996) and (U.S. Pat. No. 5,644, 020) discloses a category of diblock polyesteramides with melting point of 125° C., and mechanical properties equal to polyethylene. These diblock polyesteramides are able to quickly biodegrade under conditions that provides dampness and where humus exists.

Polymer, 39(2), 459(1998) discloses a preparation method having a carboxyl-terminated polyhexadiacidbutanediolester and hexadiacid as raw materials with cyclobutanol as a solvent. At a temperature of 200° C. a reaction occurs with 1.6 hexanediisocyanate, and produces a polyesteramide elastomer. However, the polyesteramide is unable to undergo biodegradation. P.R. China patents (99115200. X), (00112700. 4), (00112699. 7) disclose preparation methods for thermoplastic biodegradable polyesteramides and copolymers. Degradation is realized under acid conditions and a bioenvironment. However, toxic diisocyanate compounds are utilized during preparation of the polyesteramides, and thus have restricted application.

SUMMARY OF THE INVENTION

An objective of the present invention is to address shortcomings of current technology and provide a biodegradable triblock polyesteramide and preparation method. The biodegradable triblock polyesteramide is characterized in comprising a diacid, a diol, a tetracid, an amide, a diamine and a tetrahydrid alcohol The preparation method utilizes an organic tin catalyst and function of an antioxidant, whereby the biodegradable triblock polyesteramide is formed through fusion polymerization. The present invention allows for significant adjustment to structure and property of products made therefrom.

Advantages of the Present Invention:

1. In a macromolecular structure, a main-chain injected amide bonding, resulting in a greater enhancement to hydrophilicity of the polyesteramide and copolymers of the polyesteramide, as well as realizing improvement in increase in melting point, ability to be processed, ability to be dyed and hydrolysis degradation.

2. Formation of two special amide bonds within a polymer of an amide and a diamine results in guaranteeing to a higher degree properties of the polyester amid, and differs from current proprietary technology, as well as developing a new model of triblock polyesteramide.

3. Through adjusting proportion of starting raw components, the preparation method is able to control a larger range of structures and properties of products produced therefrom.

4. Abundant source of raw materials, low cost, price of products are lower than biodegradable polylactic acids. Because properties possessed by polycaprolactone are greater when compared to their price, promoting application of the products made therefrom is easier. Therefore, the present invention is clearly of economic advantage and social benefit.

The biodegradable polyesteramide may utilize the following monomers as raw materials:

1. A diacid: such as Succinic acid, adipic acid etc. to form a diacid of ester structure. Preferred diacid is a diacid of carbon alkyl containing $C_2$~$C_6$ carbon atoms.

2. A diamine: such as hexanediamine, butanediamine, etc. Preferred diamine is a diamine of carbon alkyl containing $C_2$~$C_6$ carbon atoms.

3. An alcohol amine: such as compounds of ethanolamine and butanolamine.

4. A diol: such as ethylene glycol, 1.4 butanediol, 1.6 butanediol, etc. Preferred diol is a diol of carbon alkyl containing $C_2$~$C_6$ carbon atoms.

5. An amino acid: such as aminocaproic acid, etc.

6. An amide: such as caprolactam etc.

7. A polyester oligomer: molecular weight between 200~10,000, with a hydroxy agent as terminating agent.

8. A branching agent: such as a trihydric alcohol or a tetrahydric alcohol, as well as a triacid or a tetracid. Although addition of branching agents contributes to enhancement in substance, however, damage is caused to biodegradation effectiveness.

9. A catalyst: such as a phosphor catalyst or an acid catalyst, even oxides of Mg, Zn, Ca, etc. may be used. The catalyst contributes to progress of the reaction.

10. An additive: during synthesis or processing of the polyesteramide, addition of an appropriate additive will ensure projected target objective is achieved. The additive may be an antioxidant, an organic or inorganic additive, an UV stabilizing agent, a coloring agent or dyestuffs, a flame retardant or a heat-resistant agent etc. The additive is added in a proportion 0~50% by weight.

The biodegradable triblock polyesteramide of the present invention is characterized in having a formulation composed from starting raw materials as below (percentage by weight)
  (a) Diacid: 30%~70%
  (b) Diamine: 10%~70%
  (c) Diol: 10%~50%
  (d) Amide: 5%~70%
  (e) Tetrahydrid alcohol: 0%~10%
  (f) Tetracid: 0%~10%
  (g) Catalyst: 0 ppm~50 ppm
  (h) Antioxidant: 0%~5%

A specific method for preparing the biodegradable triblock polyesteramide is disclosed as follows:

Upon weighing the aforesaid raw materials (a) and (b) for preparation of the biodegradable triblock polyesteramide, respectively place each in a reactor apparatus having a stirrer, a thermometer, a dripping device, a reflux condenser and a device for protecting gas from entering and leaving the apparatus. First influx nitrogen gas, and elevate temperature to 140° C.~160° C. while allowing a reflux reaction to proceed for 3 hours, add ©, (d), (e), (f), (g), and (h), and slowly elevate the temperature to 240° C., evacuate for 4–6 hours and thereafter take out resulting compound from the reactor apparatus, refrigerate the compound, and thereafter pulverize the compound, thereupon the biodegradable polyesteramide is acquired. Dry the biodegradable polyesteramide in a vacuum oven at 80° C. for 48 hours, whereupon biodegradable triblock polyesteramide is acquired with a formula as below:

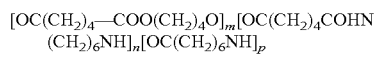

[OC(CH$_2$)$_4$—COO(CH$_2$)$_4$O]$_m$[OC(CH$_2$)$_4$COHN(CH$_2$)$_6$NH]$_n$[OC(CH$_2$)$_6$NH]$_p$

To enable a further understanding of the said objectives and the technological methods of the invention herein, the detailed description of the preferred embodiments follows hereinafter.

DETAILED DESCRIPTION OF THE PREFERRED EMBODIMENTS

Herein follows embodiments of the present invention:

EXAMPLE 1

Upon weighing 1040 grams of hexamethylene diacid and 410 grams of hexanediamine as disclosed in the aforesaid starting raw materials for preparation of a biodegradable triblock polyesteramide; respectively place each in a reactor apparatus having a stirrer, a thermometer, a dripping device, a reflux condenser and a device for protecting gas from entering and leaving the apparatus. First influx nitrogen gas, and elevate temperature to 140° C.~160° C. while allowing a reflux reaction to proceed for 3 hours. Respectively weigh out and add to the reaction 345 grams of butylene glycol, 100 grams of caprolactam, 2 grams of penta erythritol, 0.2 grams of triphenyl phosphate, 0.2 grams of dibutyl tin dilaurate; thereafter slowly elevate the temperature to 240° C., evacuate for 4–6 hours, whereupon the biodegradable polyesteramide is acquired. Stretchability strength of an injected standard sample is 28 Mpa, fracture tensibility ratio is 132%, modulus 498 Mpa, and under conditions of a PH=12 and at 80° C. temperature can realize complete degrade.

EXAMPLE 2

Upon weighing 1040 grams of hexamethylene diacid and 410 grams of hexanediamine as disclosed in the aforesaid starting raw materials for preparation of the biodegradable triblock polyesteramide, respectively place each in a reactor apparatus having a stirrer, a thermometer, a dripping device, a reflux condenser and a device for protecting gas from entering and leaving the apparatus. First influx nitrogen gas, and elevate temperature to 140° C.~160° C. while allowing a reflux reaction to proceed for 3 hours. Respectively weigh out and add to the reaction 345 grams of butylene glycol, 200 grams of caprolactam, 2 grams of penta erythritol, 0.2 grams of triphenyl phosphate, 0.2 grams of dibutyl tin dilaurate; thereafter slowly elevate the temperature to 240° C., evacuate for 4–6 hours, whereupon the biodegradable polyesteramide is acquired. Stretchability strength of an injected standard sample is 23 Mpa, fracture tensibility ratio is 118%, modulus 432 Mpa, and under conditions of a PH=12 and at 80° C. temperature can realize complete degrade.

EXAMPLE 3

Upon weighing 1040 grams of hexamethylene diacid and 410 grams of hexanediamine as disclosed in the aforesaid starting raw materials for preparation of the biodegradable triblock polyesteramide, respectively place each in a reactor apparatus having a stirrer, a thermometer, a dripping device, a reflux condenser and a device for protecting gas from entering and leaving the apparatus. First influx nitrogen gas, and elevate temperature to 140° C.~160° C. while allowing a reflux reaction to proceed for 3 hours. Respectively weigh out and add to the reaction 345 grams of butylene glycol, 350 grams of caprolactam, 2 grams of penta erythritol, 0.2 grams of triphenyl phosphate, 0.2 grams of dibutyl tin dilaurate; thereafter slowly elevate the temperature to 240° C., evacuate for 4–6 hours, whereupon the biodegradable polyesteramide is acquired. Stretchability strength of an injected standard sample is 20 Mpa, fracture tensibility ratio is 298%, modulus 534 Mpa, and under conditions of a PH=12 and at 80° C. temperature can realize complete degrade.

EXAMPLE 4

Repeat of example 3, except branching agent is replaced by 0.2 grams of tetraacetate ethylene, whereupon the biodegradable polyesteramide is acquired. Stretchability strength of an injected standard sample is 24 Mpa, fracture tensibility ratio is 228%, modulus 443 Mpa, and under conditions of a PH=12 and at 80° C. temperature can realize complete degrade.

EXAMPLE 5

Repeat of example 3, except branching agent is replaced by 0.1 grams of penta erythritol and 0.1 grams of tetraacetate ethylene, whereupon the biodegradable polyesteramide is acquired. Stretchability strength of an injected standard sample is 25 Mpa, fracture tensibility ratio is 248%, modulus 468 Mpa, and under conditions of a PH=12 and at 80° C. temperature can realize complete degrade.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A biodegradable polyesteramide having a formulation composed from starting raw materials (percentage by weight):
   - a diacid: having C2~C6 carbon atoms, with the formulation containing 30%~70% by weight;
   - a diamine: having C2~C6 carbon atoms, with the formulation containing 10%~70% by weight;
   - a diol: having C2~C6 carbon atoms, with the formulation containing 10%~50% by weight;
   - an amide: having C2~C6 carbon atoms, with the formulation containing 5%~70% by weight;
   - a branching agent: tetraacetate ethylene, with the formulation containing no more than 10% by weight;
   - a catalyst: an organic compound containing tin, with the formulation containing 0~50 ppm proportion by weight; and
   - an antioxidant: an aromatic compound, with the formulation containing 0%~5% by weight.

2. The biodegradable polyesteramide as claimed in claim 1, wherein the diacid is 1,6 hexanediacid.

3. The biodegradable polyesteramide as claimed in claim 1, wherein the diol is 1,6 hexanediamine.

4. The biodegradable polyesteramide as claimed in claim 1, wherein the diol is 1,4 butanediol.

5. The biodegradable polyesteramide as claimed in claim 1, wherein the amide is caprolactam.

6. The biodegradable polyesteramide as claimed in claim 1, wherein the catalyst is dibutyl tin dilaurate.

7. The biodegradable polyesteramide as claimed in claim 1, wherein the antioxidant is triphenyl phosphate.

8. The biodegradable polyesteramide as claimed in claim 1, wherein the biodegradable triblock polyesteramide polymerization temperature is 140° C.~300° C.

9. The biodegradable polyesteramide as claimed in claim 1, wherein the formulation contains 0.1%~10% by weight of the branching agent.

* * * * *